United States Patent [19]
Matsuda et al.

[11] Patent Number: 5,090,781
[45] Date of Patent: Feb. 25, 1992

[54] METHOD FOR CONTROLLING HYDRAULIC BRAKING PRESSURE IN VEHICLE

[75] Inventors: Shohei Matsuda; Tadatoshi Haga, both of Wako, Japan

[73] Assignee: Honda Giken Kogyo Kabushiki Kaisha, Tokyo, Japan

[21] Appl. No.: 667,356

[22] Filed: Mar. 7, 1991

Related U.S. Application Data

[63] Continuation of Ser. No. 365,062, Jun. 12, 1989, abandoned.

[30] Foreign Application Priority Data

Jun. 13, 1988 [JP] Japan .................................. 63-145240

[51] Int. Cl.$^5$ .................................................. B60T 8/60
[52] U.S. Cl. ...................................... 303/103; 303/106; 303/108; 303/95
[58] Field of Search ......................... 303/91, 93, 94–96, 303/97, 98, 99, 100, 102, 103, 106, 107, 108, 109, 111; 188/181 A, 181 C, 181 R; 364/426.01, 426.02

[56] References Cited

U.S. PATENT DOCUMENTS

| | | | |
|---|---|---|---|
| 4,077,675 | 3/1978 | Leiber et al. | 303/95 |
| 4,485,445 | 11/1984 | Braschel | 303/96 X |
| 4,739,484 | 4/1988 | Fennel | 303/103 X |
| 4,741,580 | 5/1988 | Matsubara et al. | 303/105 |
| 4,762,375 | 8/1988 | Maki et al. | 303/103 X |
| 4,773,714 | 9/1988 | Shimanuki et al. | 303/108 |
| 4,859,002 | 8/1989 | Yoshino | 303/95 X |

*Primary Examiner*—Douglas C. Butler
*Attorney, Agent, or Firm*—Armstrong, Nikaido, Marmelstein, Kubovcik & Murray

[57] ABSTRACT

According to the present invention, the time during which the hydraulic braking pressure is intermittently maintained, is varied depending upon the degree of decrease in the wheel speed relative to the vehicle speed, so that the time may be prolonged when a large decrease occurs. Hence, unnecessary maintenance of the intermittent maintaining time is avoided in order to prevent any unnecessary operational noise from being produced.

5 Claims, 3 Drawing Sheets

METHOD FOR CONTROLLING HYDRAULIC BRAKING PRESSURE IN VEHICLE

This application is a continuation of application Ser. No. 365,062 filed June 12, 1989 now abandoned.

FIELD OF THE INVENTION

The present invention relates to a method for controlling hydraulic braking pressure in a vehicle. The hydraulic braking pressure is progressively increased by intermittently maintaining the pressure after reduction thereof.

BACKGROUND OF THE INVENTION

In a conventional hydraulic braking-pressure controlling method, the hydraulic braking pressure is intermittently maintained by a chopping control for a given period of time, so that the braking pressure may be progressively increased.

In the above prior art method, however, the chopping control is performed within a given time T, as shown in FIG. 3(b), both when the decrease in the wheel speed Vw is relatively large, as shown by a solid line in FIG. 3(a), and when the decrease in the wheel speed is relatively small, as shown by a broken line, relative to a vehicle speed Vv, shown by a dashed line in FIG. 3(a). Therefore, the decrease in the wheel speed Vw relative to the vehicle speed Vv is relatively small and is overcome relatively early during braking. Nevertheless, the chopping control may still be maintained in some cases, resulting in maintaining unnecessary chopping control and operational noise.

SUMMARY OF THE INVENTION

The present invention has been accomplished with the problems of the prior art in mind, and it is an object of the present invention to provide a method for controlling hydraulic braking pressure in a vehicle, wherein unnecessary chopping control is avoided in order to prevent any unnecessary operational noise from being produced.

According to the present invention, the time during which the hydraulic braking pressure is intermittently maintained, is varied depending upon the degree of decrease in the wheel speed relative to the vehicle speed, so that the time may be prolonged when a large decrease occurs.

With the above method, the amount of time that the hydraulic braking pressure is intermittently maintained is varied depending upon the degree of decrease in the wheel speed relative to the vehicle speed. Hence, unnecessary maintenance of the above intermittent maintaining time is avoided in order to prevent any unnecessary operational noise from being produced.

BRIEF DESCRIPTION OF THE DRAWINGS

FIGS. 1 and 2 illustrate one embodiment of the present invention, wherein

FIG. 1 is a diagram of a control circuit; and

DESCRIPTION OF THE PREFERRED EMBODIMENTS

Figure 1:
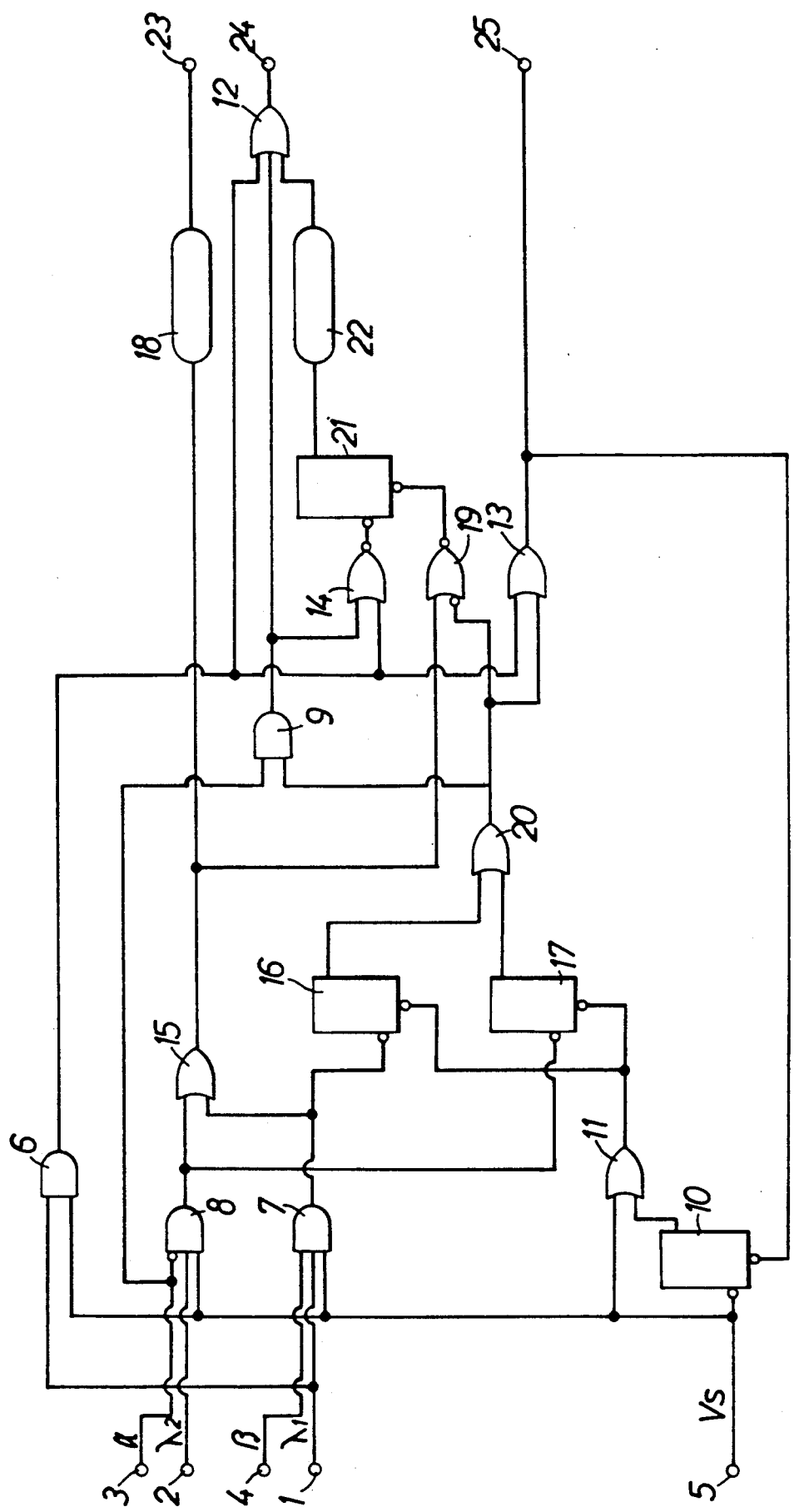

The present invention will now be described by way of one embodiment with reference to the accompanying drawings. Referring first to FIG. 1, a signal required for control of a wheel brake is input to each of first to fifth input terminals 1 to 5. Specifically, a signal $\lambda_1$ is input to the first input terminal 1. The signal $\lambda_1$ is at a high level when the wheel speed has a value less than a first reference wheel speed resulting from multiplication of a vehicle speed based upon an estimated wheel speed by a certain coefficient, e.g., 0.9 to 0.8. A signal $\lambda_2$ is input to the second input terminal 2. The signal $\lambda_2$ is at a high level when the wheel speed has a value less than a second reference wheel speed resulting from multiplication of a vehicle speed based upon an estimated wheel speed by a coefficient which is lower than the first reference wheel speed, e.g., 0.7 to 0.6. A signal $\alpha$ is at a high level when the wheel acceleration has exceeded a certain value. The signal $\alpha$ is input to the third input terminal 3. A signal $\beta$ is at a high level when the wheel deceleration has exceeded a certain value. The signal $\beta$ is input to the fourth input terminal 4. A signal Vs is at a high level when the vehicle speed has exceeded a reference speed, e.g., 10 km/hr. The signal Vs is input to the fifth input terminal 5.

The first input terminal 1 is connected to respective input terminals of AND circuits 6 and 7. The second input terminal 2 is connected to an input terminal of an AND circuit 8. The third input terminal 3 is connected, in an inverted manner, to another input terminal of the AND circuit 8 and is also connected to an input terminal of an AND circuit 9. The fourth input terminal 4 is connected to another input terminal of the AND circuit 7. The fifth input terminal 5 is connected to respective input terminals of the AND circuits 6, 7 and 8. Moreover, the fifth input terminal 5 is connected, in an inverted manner, to an input terminal of a timer circuit 10 and is connected to one of the input terminals of an OR circuit 11. An output terminal of the timer circuit 10 is connected to the other input terminal of the OR circuit 11.

Thus, the AND circuit 6 produces a high level signal when the vehicle speed is determined to have exceeded the reference speed and the wheel speed is determined to become less than the first reference wheel speed, detecting a possibility of a wheel being locked. The AND circuit 7 produces a high level signal when the vehicle speed exceeds the reference speed, the wheel speed is determined to have become less than the first wheel speed, and the wheel deceleration has exceeded the certain value, thus detecting a possibility of a wheel being locked. The AND circuit 8 produces a high level signal when the vehicle speed exceeds the reference speed and the wheel speed is not increasing, and is determined to have become less than the second reference wheel speed, detecting an increase in the possibility of the wheel being locked. The OR circuit 11 produces a high level signal either when the vehicle speed has exceeded the reference speed, or when the output from the timer circuit 10 is at a high level. The timer circuit 10 produces a high level signal which is sustained for a given time $T_1$ from when the output from the fifth input terminal 5 has become a low level, i.e., from when the vehicle speed has become less than the reference velocity.

An output terminal of the AND circuit 6 is connected to respective input terminals of OR circuits 12 and 13 and a NOR circuit 14. An output terminal of the AND circuit 7 is connected to an input terminal of an OR circuit 15 and is also connected, in an inverted manner, to an input terminal of a timer circuit 16. An output terminal of the AND circuit 8 is connected to another input terminal of the OR circuit 15 and is also connected, in an inverted manner, to an input terminal of the timer circuit 17. Moreover, an output terminal of the OR circuit 11 is invertedly connected to respective reset input terminals of the timer circuits 16 and 17.

Thus, the OR circuit 15 outputs a high level signal to reduce the hydraulic braking pressure when at least either one of the AND circuits 7 and 8 outputs a high level signal. The output from the OR circuit 15 is connected to a first output terminal 23 through an oscillator circuit 18. The first output terminal 23 serves to control an inlet valve in an anti-lock control device, so that when the output signal from the first output terminal 23 is at a high level, the inlet valve is opened to reduce the hydraulic braking pressure.

The timer circuit 16 produces a high level signal, which is sustained only for a given time $T_2$, from when the output from the AND circuit 7 has become a low level. The timer circuit 16 is reset when the output from the OR circuit 11 is at a low level, (i.e., the vehicle speed is less than the reference speed) and in addition, the given time $T_1$, set in the timer 10, has elapsed. Further, the timer circuit 17 produces a high level, which is sustained only for a given time $T_3$ which is longer than the given time $T_2$, from when the output from the AND circuit 8 has become a low level. The timer circuit 17 is reset as the output from the OR circuit 11 becomes a low level.

An output terminal of the AND circuit 15 is connected to an input terminal of a NOR circuit 19 in addition to the oscillator circuit 18. Output terminals of the timer circuits 16 and 17 are connected to input terminals of an OR circuit 20. An output terminal of the OR circuit 20 is connected to an input terminal of the AND circuit 9 and an input terminal of the OR circuit 13, and is also connected, in an inverted manner, to an input terminal of the NOR circuit 19.

The AND circuit 9 produces a high level signal when the wheel speed is increasing and at least one of the timer circuits 16 and 17 produces a high level signal. An output terminal of the AND circuit 9 is connected to an input terminal of the OR circuit 12. The NOR circuit 14 produces a high level signal when outputs from the AND circuits 6 and 9 are at a low level. An output terminal of the NOR circuit 14 is connected, in an inverted manner, to an input terminal of a timer circuit 21. The NOR circuit 19 produces a high level signal when the output from the OR circuit 15 is at a low level and the output from the OR circuit 20 is at a high level. An output terminal of the NOR circuit 19 is connected, in an inverted manner, to a reset input terminal of the timer circuit 21.

The timer circuit 21 produces a high level signal, which is sustained only for a given time $T_4$, from when the output from the NOR circuit 14 has become a low level. An output terminal of the timer circuit 21 is connected to the remaining input terminal of the OR circuit 12 through an oscillator circuit 22. An output terminal of the OR circuit 12 is connected to a second output terminal 24 which serves to control the output valve in the antilock control device, so that when the output signal from the second output terminal 24 is at a high level, the outlet valve is opened to increase the hydraulic braking pressure.

An output terminal of the OR circuit 13 is connected, in an inverted manner, to a reset input terminal of the timer circuit 10 and is also connected to a third output terminal 25. Thus, when the output from the OR circuit 13 is at a low level, the timer circuit 10 is reset. The third output terminal 25 serves to provide an anti-lock control which is performed as the output from the third output terminal 25 becomes a high level.

The operation of this embodiment will be described below. When the vehicle speed has become less than the reference speed Vs during a braking operation, resetting of the timer circuits 16 and 17 is delayed by the given time $T_1$ as the timer circuit 10 produces the high level signal which is sustained by the given time $T_1$. Only for a time determined by the timers 16 and 17 which lasts until an elapse of the given time $T_1$, the oscillator circuit 22 is operated to chop the output signal from the second output terminal 24, so that the hydraulic braking pressure may be intermittently maintained. This causes the hydraulic braking pressure to be stepwise increased. This increase in the hydraulic braking pressure is a moderate increase. Accordingly, extra hydraulic braking pressure, having been restricted up to now, cannot be rapidly supplied to the brake, to avoid any degradation of the braking feeling.

Figure 2A:
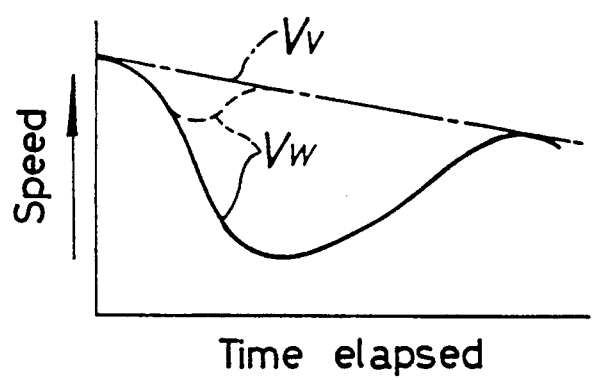
FIG. 2a, 2b and 2c are graphs illustrating control characteristics.
Figure 2B:
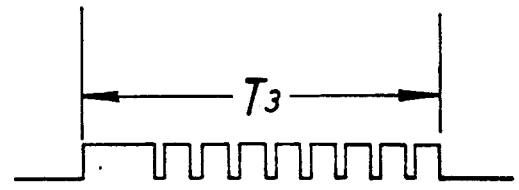
Figure 2C:
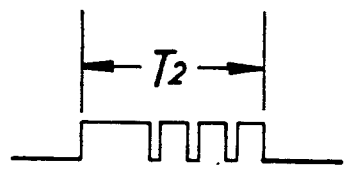
Figure 3A:
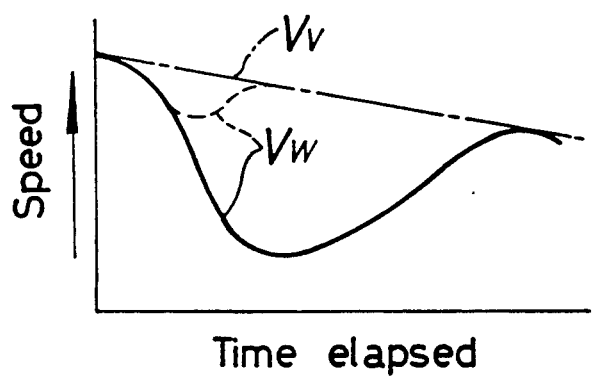
FIG. 3a and 3b are graphs illustrating conventional control characteristics.
Figure 3B:
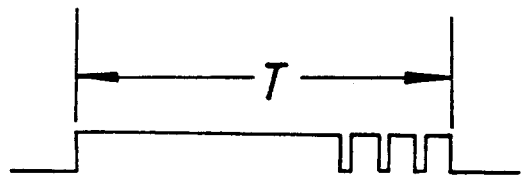

The oscillating time of the oscillator circuit 22 is determined by the timer 16 when the wheel speed has become less than the first reference wheel speed, or by the timer 17 when the wheel speed has become less than the second reference wheel speed. Specifically, when the decrease in the wheel speed Vw, relative to a vehicle speed Vv, is large as shown by a solid line in FIG. 2(a), the chopping time $T_3$ is relatively long, as shown in FIG. 2(b), with the hydraulic braking pressure being intermittently maintained. On the other hand, when the decrease in the wheel speed Vw, relative to the vehicle speed Vv, is small, as shown by a broken line in FIG. 2(a), the chopping time $T_2$ is relatively short, as shown in FIG. 2(c), with the hydraulic braking pressure being intermittently maintained. Accordingly, the time of the chopping operation as effected, even though the decrease in the wheel speed Vw has been overcome, is shortened to the minimum which prevents the generation of any unnecessary operational noise.

In another embodiment of the present invention, a rise in the level of the signals $\lambda_1$ and $\lambda_2$ may be used in place of the falling of the signals $\lambda_1$ and $\lambda_2$ in order to set the timer circuits 16 and 17.

As discussed above, according to the present invention, the time during which the hydraulic braking pressure is intermittently maintained is varied depending upon the degree of decrease in the wheel speed relative to a vehicle speed, so that this time may be prolonged when a large decrease occurs. Therefore, the length of time of unnecessary chopping control can be shortened to a minimum to inhibit the generation of any operational noise.

From the foregoing description of the preferred embodiment of the invention, it will be apparent that many modifications may be made therein. It should be understood that these embodiments are intended as one example of the invention only, and that the invention is not limited thereto. Therefore, it should be understood that the appended claims are intended to cover all modifications that fall within the true spirit and scope of the invention.

What is claimed is:

1. A method for controlling a hydraulic braking pressure in a vehicle comprising the steps of:
    progressively increasing the hydraulic braking pressure by intermittently maintenance thereof for a duration of operation time of one chopping operation after a reduction of the hydraulic braking pressure; and
    varying said duration of operation time of one chopping operation depending upon a degree of decrease in a wheel speed relative to a vehicle speed, so that said duration of operation time is increased when the degree of decrease in the wheel speed relative to the vehicle speed increases.

2. A method for controlling a hydraulic braking system in a vehicle according to claim 1, further comprising the steps of setting a first reference wheel speed and a second reference wheel speed which is lower than said first reference wheel speed in order to determine the degree of decrease in the wheel speed relative to the vehicle speed during braking, and prolonging said predetermined period of time when the wheel speed has become less than the second reference wheel speed.

3. A method for controlling a hydraulic braking pressure in a vehicle comprising the steps of:
    progressively increasing the hydraulic braking pressure by intermittently maintenance thereof for a predetermined period of time after a reduction of the hydraulic braking pressure;
    varying said predetermined time depending upon a degree of decrease in a wheel speed relative to a vehicle speed, so that said predetermined period of time is increased when the degree of decrease in the wheel speed relative to the vehicle speed increases;
    setting a first reference wheel speed and a second reference wheel speed which is lower than the first reference wheel speed, said first and second reference wheels speeds set from the vehicle speed while taking into account respective predetermined slip ratios;
    reducing the hydraulic braking pressure for a first period of time when the wheel speed has become less than the first reference wheel speed and simultaneously a wheel deceleration exceeds a certain value;
    reducing the hydraulic braking pressure for a second period of time when the wheel speed has become less than the second reference wheel speed and simultaneously a wheel acceleration is below a certain value; and
    prolonging said predetermined period of time when it comes after said second period of time of pressure reduction than when it comes after said first period of time of pressure reduction.

4. A method for controlling a hydraulic braking pressure in a vehicle according to claim 3, further comprising the step of initiating progressively increasing the hydraulic braking pressure when the wheel speed exceeds said first reference wheel speed after termination of either the first or second periods of time.

5. A method for controlling a hydraulic braking pressure in a vehicle comprising the steps of:
    progressively increasing the hydraulic braking pressure by intermittently maintenance thereof for a predetermined period of time after a reduction of the hydraulic braking pressure; and
    varying said predetermined period of time depending upon a degree of decrease in a wheel speed relative to a vehicle speed, so that said predetermined period of time is increased when the degree of decrease in the wheel speed relative to the vehicle speed increases;
    wherein a chopping means is provided for chopping an operation of a antilock control means so as to permit the hydraulic braking pressure to increase progressively, said chopping means selectively chopping the operation of the antilock control means for a longer duration or a shorter duration, the method further comprising the steps of setting a high reference wheel speed and a low reference wheel speed, and permitting the hydraulic braking pressure to increase progressively for said longer duration in response to detection of the wheel speed having decreased below said low reference wheel speed.

* * * * *